United States Patent [19]
Hochreiter

[11] 3,836,933
[45] Sept. 17, 1974

[54] COLLAPSIBLE CAMERA

[75] Inventor: William T. Hochreiter, Rochester, N.Y.

[73] Assignee: Eastman Kodak Company, Rochester, N.Y.

[22] Filed: July 30, 1973

[21] Appl. No.: 383,636

[52] U.S. Cl. .................................... 95/11 R, 95/39
[51] Int. Cl. ............................................ G03b 17/04
[58] Field of Search ................................. 95/11, 39

[56] References Cited
UNITED STATES PATENTS
3,045,572   7/1962   Kinnard ................................ 95/18
FOREIGN PATENTS OR APPLICATIONS
17,689   8/1903   Austria ................................. 95/39

*Primary Examiner*—John M. Horan
*Attorney, Agent, or Firm*—William C. Dixon

[57] ABSTRACT

A large-format camera has a relatively thin, vertically oriented housing that includes a lower body section for receiving film with its exposure surface facing rearwardly and an upper head section that contains a forwardly facing objective lens. Behind the lens, a sloped upper mirror deflects the image rays downwardly to an oppositely sloped lower mirror, which then deflects those rays forwardly to locate the focused image in coincidence with the film plane. One or both of the mirrors may extend partially into the housing, but in their operative positions the major portions of both mirrors project rearwardly beyond the housing and are covered by a substantially conforming enclosure. To render the whole camera thinner and more compact when not in use, the mirrors are coupled to the housing by a collapsible linkage arrangement and the mirror enclosure is foldable, thereby permitting movement of both the mirrors and the enclosure to respective inoperative positions close to the housing. The head section of the housing permits convenient location of interacting camera mechanisms in close proximity to one another, while the external configuration of the camera provides a comfortable grip and a stable holding position for the user.

25 Claims, 9 Drawing Figures

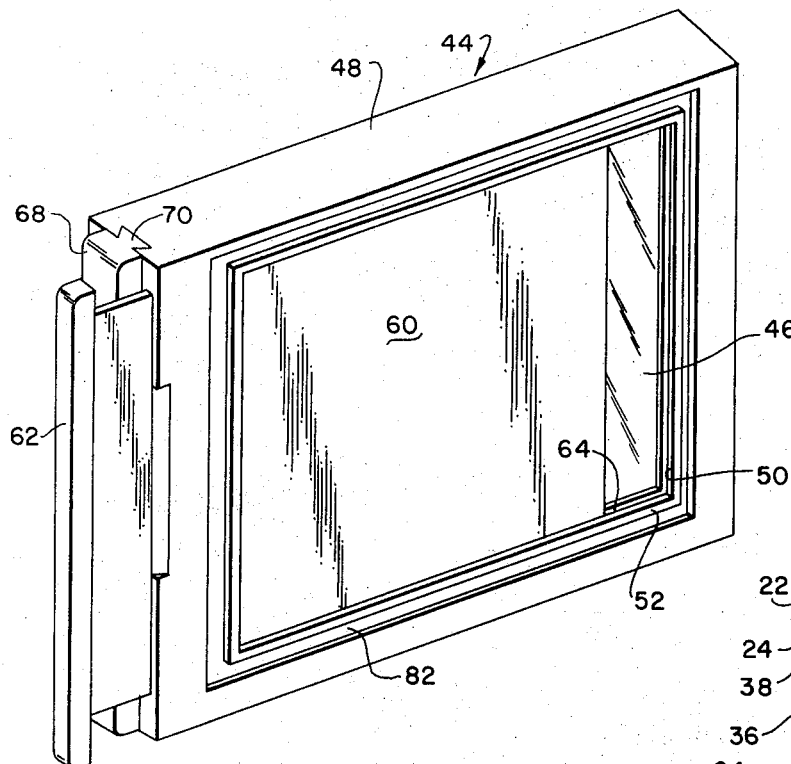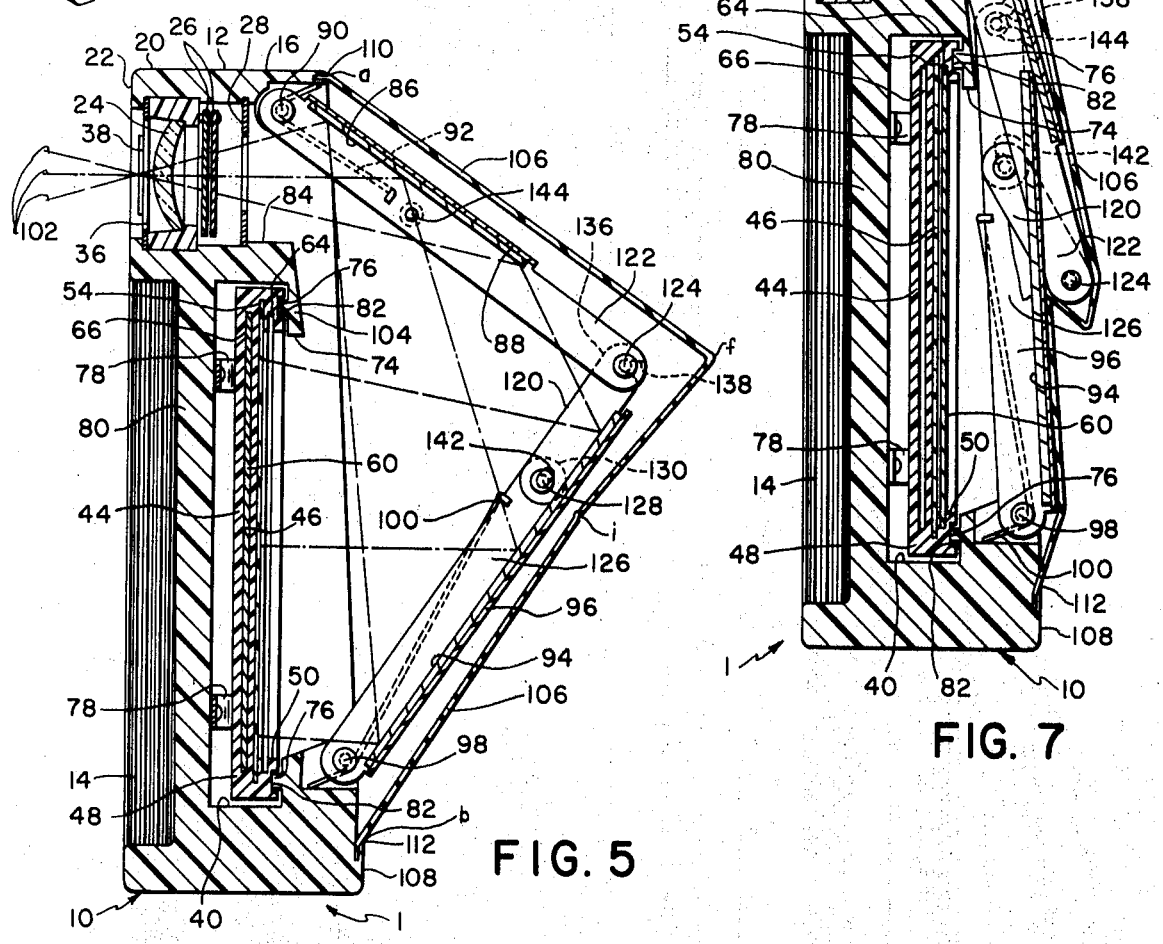

COLLAPSIBLE CAMERA

BACKGROUND OF THE INVENTION

The present invention relates to photography, and more particularly to a large-format camera of compact design having an optical path that is folded by two collapsible mirrors.

Various prior-art references, such as British Pat. No. 3,058 and No. 687,374, German Pat. Utility Model No. 1,978,478, and U.S. Pat. No. 2,778,288, No. 3,045,572, and No. 3,543,661, disclose photographic cameras employing mirrors or equivalent reflective surfaces for folding the optical path between the lens and the film plane to reduce at least on of the camera dimensions. The present invention is specifically concerned with a vertically oriented camera of this general type that uses two collapsible mirrors to fold the optical path through 180 degrees, for example, between a forward-facing camera lens and a rearward-facing photosenstive film surface. Use of two such mirrors in this fashion not only renders the camera thinner and more compact but, unlike the collapsible single-mirror arrangement disclosed in the last-mentioned of the above references, it also cancels image reversal that is caused by use of one mirror alone, and thereby allows the camera to be used with conventional, i.e., nonreversing, film.

As shown in the above references, previously known cameras employing two mirrors generally enclose both mirrors entirely within the same housing, usually of a rctangular or other box-like configuration, that contains the photosenstive film. Accordingly, the resulting reduction in one dimension of the camera has typically been achieved at the expense of some other dimension and with a concurrent increase in bulkiness or inconvenience in handling, particularly in the case of cameras adapted for use with large-format film.

Alternatively, bi-mirror arrangements have been used in adaptors or attachments designed to increase the effective focal length of cameras to render such cameras usable with larger-format film. In such constructions, for example, the Nikon Speed Magny-100 system described in the Apr. 1, 1966 issue of "Photographic Trade News," the attachment generally resembles a periscope that is provided with an additonal lens and which is adapted to be mounted on the reaward-facing camera body below the forward-facing camera lens. In addition to being somewhat bulky and incompatible with a pleasing aesthetic appearance, this type of structure can be difficult to manipulate because of the physical separation between the shutter or other camera mechanism and the film, and because of the location relative to the camera's center of gravity where the camera ordinarily would be gripped by the user.

While folding cameras employing flexible bellows and collapsible linkages are disclosed in various references, such as the aforementioned U.S. Pat. No. 3,543,661 and U.S. Pat. No. 3,677,160 and No. 3,693,526, such cameras are not of the type with which the present invention is concerned.

SUMMARY OF THE INVENTION

Accordingly, a principal object of the present invention is to facilitate the manufacture, handling, and use of photographic cameras employing large-format film.

Another object of the invention is to provide a compact and convenient camera in a manner consistent with pleasing aesthetic design criteria.

Still another object of the invention is to achieve the foregoing objects by means well suited to provide a camera having structural integrity and durability.

These and other objects and advantages are realized in a photographic camera constructed in accordance with the present invention. Such a camera comprises a generally rectangular housing including means for supporting a sheet of photographic film in an exposure plane; a lens for establishing a focused image of a subject to be photographed; a pair of reflecting surfaces supported by the housing for movement from respective operative positions wherein the reflecting surfaces are disposed in angular relation to each other and extend substantially beyond the housing to define a folded optical path between the lens and the exposure plane, for locating the focused image in coincidence with that plane, to respective inoperative positions wherein the reflecting surfaces are retracted toward the housing; and means enclosing the reflecting surfaces in light-tight relation to the housing and movable in cooperation with the reflecting surfaces from an erect position wherein the surfaces are in their operative positions to a collapsed position wherein the surfaces are in their inoperative positions.

A camera constructed in accordance with the preferred and alternative embodiments of the invention illustrated herein comprises a large-format camera having a relatively thin, vertically oriented housing that includes a lower body section for receiving film with its exposure surface facing rearwardly and an upper head section that contains a forwardly facing objective lens. Behind the lens, a sloped upper mirror deflects the image rays downwardly to an oppositely sloped lower mirror, which then deflects the rays forwardly to locate the focused image in coincidence with the film plane. One or both of the mirrors may extend partially into the housing, but in their operative positions the major portions of both mirrors project rearwardly beyond the housing and are covered by a substantially conforming enclosure. To render the camera thinner and more compact when not in use, the mirrors are coupled to the housing by a collapsible linkage arrangement and the mirror enclusre is foldable, thereby permitting movement of both the mirrors and the enclosure to their respective inoperative and collapsed positions close to the housing.

A particularly advantageous feature of the illustrated embodiments is that certain major components of the camera, such as its exposure controlling, flash firing, and camera operating means, are located in the head section of the housing, all in relatively close proximity to one another, to faciliate their manufacture, interlinking, and coordination. Such components also are relatively close to the film and any mechanism that might be associated therewith, such as a film advancing means, again to permit convenient electrical and/or mechanical coordination of the camera's various functions.

Another advantageous feature of the ilustated embodiments is that the exterior configuration of the camera is particularly conducive to comfortable gripping by the user, and facilitates its stable support in the picture-taking position. While many factors are involved, as will become more apparent hereinafter, it may readily be noted that the center of gravity of the camera is located between the housing end portions that are normally gripped by the user's hands when the camera is vertically oriented as shown.

Various means for practicing the invention and other advantages and novel features thereof will become apparent in the detailed description of the illustrated preferred and alternative embodiments of the invention presented below. cl BRIEF DESCRIPTION OF THE DRAWINGS In the description of the illustrated embodiments presented below, reference is made to the accompanying drawings, wherein like reference numerals denote like elements and wherein:

FIG. 2 is a perspective view of the film holder used in the camera of FIG. 1;

FIG. 5 is a cross-sectioned, end-elevational view taken along line 5—5 of FIG. 1;

FIG. 7 is a cross-sectioned, end-elevational view similar to FIG. 5 but showing the camera of that figure in its collapsed, inoperative configuration shown in FIG. 6;

DESCRIPTION OF THE ILLUSTRATED EMBODIMENTS

Figure 1:
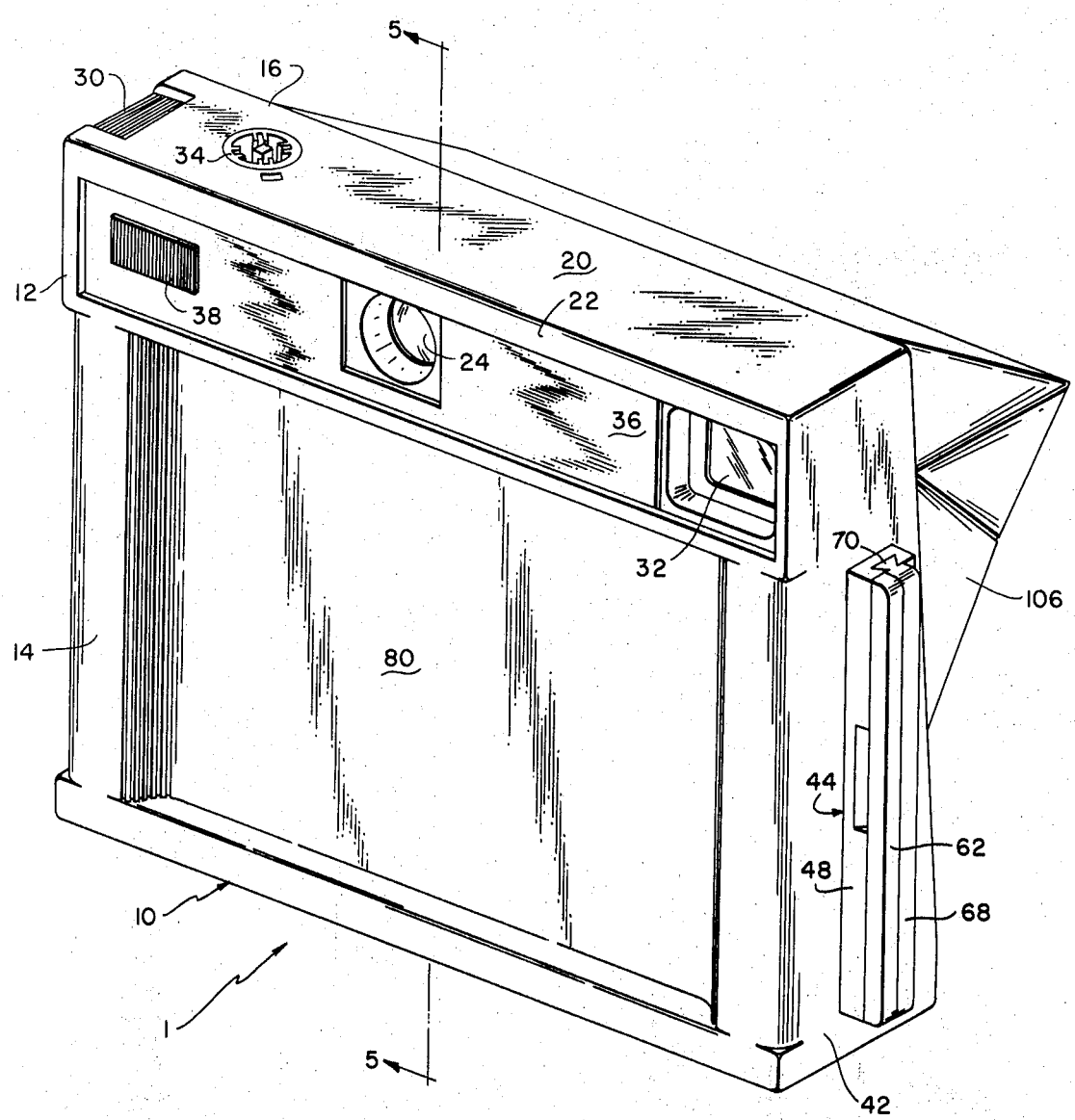
FIG. 1 is a perspective front view of a large-format camera constructed in accordance with the preferred embodiment of the present invention, showing the camera in its erect, operative configuration.

Because certain parts of photographic and related apparatus are well known, the following description is directed in particular to those elements forming, or cooperating directly with, the present invention, elements that are not specifically shown or described herein being understood to be selectable from those known in the art.

THE PREFERRED EMBODIMENT

The camera 1 illustrated in FIGS. 1 and 3–7 of the drawings comprises a rigid, relatively thin, substantially rectangular, box-like housing 10 comprising an upper or head section 12 and a lower or body section 14. The housing preferably is molded of a high-impact plastic material to provide a strong, unitary structure for supporting the various elements of the assembled camera.

A mechanism support member 16, which also is molded of a strong plastic material, provides the top and front walls 20 and 22, respectively, of the upper or head section 12 of the housing. This support member supports a forward-facing objective lens 24 and a shutter mechanism, which is represented in FIGS. 5 and 7 by a pair of shutter blades 26 and an aperture plate 28. The support member also supports a shutter operating slide 30, a viewfinder 32, and a flash illumination system comprising a rotatable flash unit socket 34 associated with a mechanism for indexing the socket and firing successive flash lamps in synchronism with the operation of the camera shutter. An automatic exposure control system also can be mounted on member 16 to vary the speed or aperture of the shutter. A slide plate 36 located forwardly of the lens is adapted to be slid endwise by a serrated slide button 38 to a position at which it covers both the lens and the viewfinder to protect them from dirt or accidental damage when the camera is not in use. Because all of these elements are supported by member 16, the entire film exposing mechanism can be produced as a unitary subassembly, which greatly facilitates both the manufacture and the servicing of the camera.

The lower or body section 14 of the housing is substantially the same thickness as the upper or head section 12, although it may be made slightly thicker at the bottom to provide a broader base on which the camera can stand in its vertical orientation as shown. Body section 14 includes an internal film holder compartment 40, as shown in FIGS. 5 and 7. This compartment is in lateral alignment with a rectangular opening in end wall 42 for receiving a film holder 44 in a position suitable for exposing a photosenstive film sheet 46 therein to actinic radiation admitted into the camera by shutter blades 26.

The film holder 44 used in the illustrated camera, and best shown in FIGS. 2, 5, and 7, comprises a box-like casing 48 with a forward-facing (as viewed in FIG. 2) exposure window 50 surrounded by a lip 52. Photosenstive film sheet 46 is loated in a groove 54 in the casing, as shown in FIGS. 5 and 7, so that its emulsion surface is held in a flat plane behind exposure window 50. An opaque cover member 60 having a handle 62 at one end thereof is initially located in a groove 64 forwardly of the film sheet, as shown in FIGS. 2 and 7, to protect the emulsion surface from ambient light. After the film holder has been fully inserted into the camera as shown in FIG. 1, cover member 60 is withdrawn from groove 64 and inserted into another groove 66 located behind the film sheet, as shown in FIG. 5. Groove 64 at its open end is provided with light sealing means of a type known in the art to prevent ambient light from entering groove 64 and fogging the film sheet. After the film sheet has been exposed, cover member 60 is withdrawn from groove 66 and reinserted into groove 64 to protect the exposed film sheet from ambient light when the film holder is removed from the camera.

To remove the film sheet from its holder for processing, the holder is provided with a removable end member 68 slidably joined to casing 48 in dovetail fashion, as shown in FIG. 2, member 68 being slidable endwise from a mating, mortise-shaped casing groove 70 which opens inwardly to groove 54 and outwardly to the exterior of the holder when member 68 is removed. With member 68 removed, the holder need merely be turned on its now-open end and film sheet 46 allowed to slide out of groove 54. The holder may then be reloaded with a new, unexposed film sheet and used again as just described.

When film holder 44 is fully inserted into compartment 40, as shown in FIGS. 1, 5, and 7, exposure window 50 faces rearwardly relative to the camera. A rectangular opening 74 in body section 14 of the camera housing is aligned with exposure window 50 and is surrounded by a rectangular, forwardly projecting rib 76. A pair o springs 78 on the inner face of body section front wall 80 urge the film holder rearwardly to seat its rectangular surface 82 surrounding lip 52 against the forward face of camera rib 76. Such engagement of surface 82 with rib 76 provides a light-tight interface between the film holder and the camera housing, and accurately locates the photosensitive surface of film sheet 46 in a predetermined exposure plane oriented in generally parallel relation to the camera housing.

Figure 4:
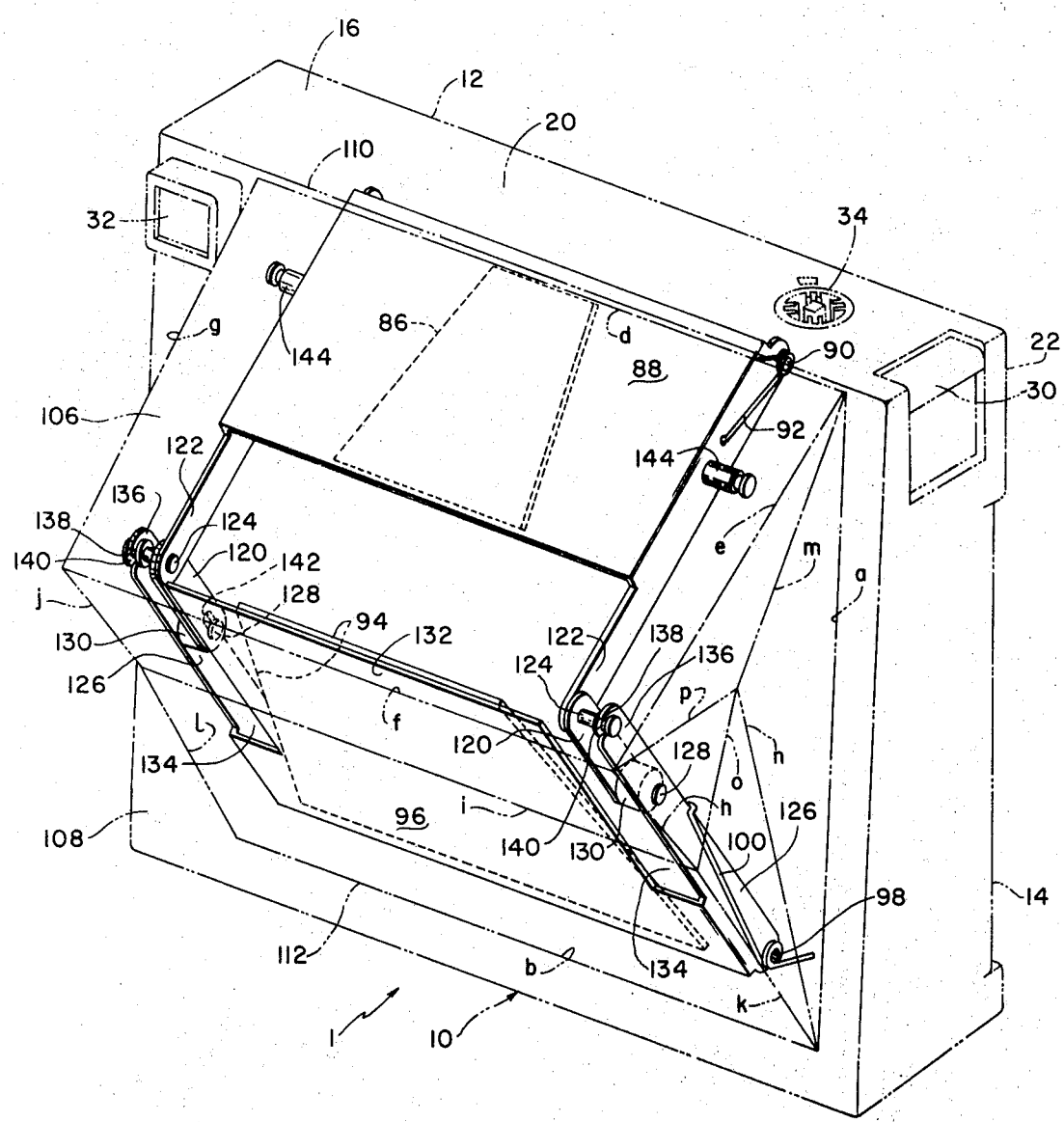
FIG. 4 is a phantom view corresponding to FIG. 3, showing the arrangement of the camera mirrors, collapsible linkage, and bellows when in their operative, erect positions.
Figure 6:
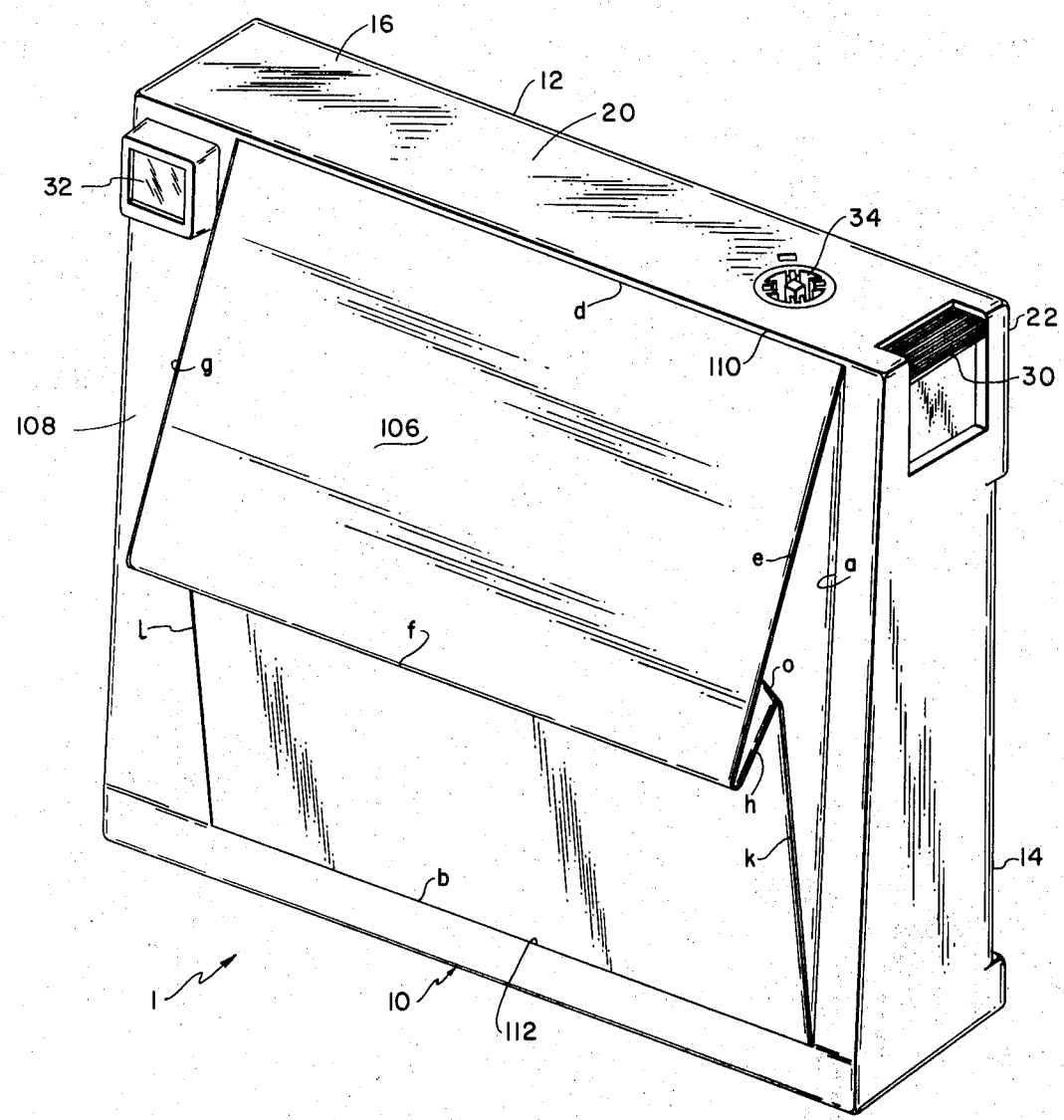
FIG. 6 is a perspective rear view similar to FIG. 3 but showing the camera of that figure in its collaped, inoperative configuration.

Behind objective lens 24, the head section 12 of the camera housing includes an opening 84 through which scene light admitted by the shutter passes to the flat front surface of an angularly diposed upper mirror 86. As best shown in FIG. 4, mirror 86 preferably is of a trapezoidal shape corresponding generally to its plane of intersection with the pyramidal optical path between lens 24 and exposure window 50. Mirror 86 is supported by a U-shaped link 88 which preferably is made of sheet metal and is pivotally coupled to head section 12 as at pin 90. Biasing link 88 for pivotal movement toward the camera housing is a spring 92. A similarly shaped but larger lower mirror 94 is supported in rearward alignment with exposure window 50 by a link 96 also preferably made of sheet metal and pivotally coupled to body section 14 as at pin 98. Biasing link 96 for pivotal movement away from the camera housing is a spring 100.

Pivotally interconnecting links 88 and 96 are a pair of relatively short links 120, best shown in FIG. 4. Each lin 120 is pivotally coupled at one end thereof to a rearwardly extending end portion 122 of link 88 by a pin 124, and at its other end to an intermediate point on a rearwardly extending arm 126 of link 96 by a pin 128. Each link 120 is separated from the arm 126 to which it is coupled by a spacer 130 having an outside diameter approximately equal to the width of arm 126. It will be noted that each arm 126 is spaced from the mirror supporting portion 132 of link 96 by a cut-out area 134 which is dimensioned to receive link 120 and end portion 122 when moved to their collapsed positions shown in FIG. 7. At the rearwardly extending end portion 136 of each arm 126 is a substantially U-shaped opening 138, which is constricted slightly at its entrance and otherwise dimensioned to matingly receive and releasably retain a cooperating end portion 140 of pin 124 when links 88, 96, and 120 are in their erect positions shown in FIGS. 4 and 5. It will thus be apparent that such cooperation between opening 138 and end portion 140 of pin 124, especially when aided by the biasing influences of springs 92 and 100, effectively but releasably retains the links in their erect positons as shown.

To release the links from those positions and move them to their collaped positions shown in FIG. 7, the user need merely press forwardly with his thumbs against link 96, or rather against the enclosing bellows behind link 96, preferably at points aligned approximately with spacers 130. As viewed in FIG. 4, this will cause link 96 to pivot clockwise about pin 98 toward housing 10, thereby withdrawing end portion 140 of pin 124 from opening 138, which in turn will cause each link 120 to pivot counterclockwise about pins 128 and 124 as it is moved toward the housing by arm 126, and will cause link 88 to pivot counterclockwise about pin 90 as it is moved toward the housing by link 120. In this manner, the mirror supporting linkage comprising links 88, 96, and 120 is moved from its erect condition shown in FIGS. 4 and 5 to its collapsed condition shown in FIG. 7. To faciliate such movement, each pin 128 is received in a slot 142 in its corresponding link 120 to permit a small amount of lost motion between arms 126 and links 120 as they are moved to their collapsed positions.

To releasably hold the mirror supporting linkage in its collapsed condition, a pair of pins 144, similar to and parallel with pins 124, project laterally from midportions of link 88 as shown in FIG. 4. Pins 144 are so located on link 88 that, during the final portion of the collapsing movement of the linkage, pins 144 enter openings 138 in arms 126 just as pins 124 do during the final portion of the erecting movement. With pins 144 thus fully seated in openings 138, and with springs 92 and 100 tending to maintain that relationship, the linkage is effectively but releasably retained in its collaped condition shown in FIG. 7. To release the linkage from that condition and return it to its erect condition shown in FIG. 5, the user need merely squeeze the enclosing bellows laterally inwardly, preferably against the end portions 140 of pins 124, and pull rearwardly. Such action will withdraw pins 144 from openings 138 and cause motions of the various links in directions opposite to those described above in reference to the collapsing movement, until the linkage is again releasably retained in its erect condition.

When the linkage is in its erect condition, the mirrors 86 and 94 supported thereby are accurately disposed in their operative positions. When so disposed, as shown in FIG. 5 by optical rays 102, upper mirror 86 deflects the optical ray path from lens 24 downwardly to lower mirror 94, which, in turn, deflects the ray path fowardly so that the optical image is accurately focused in coincidence with the plane of film sheet 46. As mentioned above, the trapezoidal shape of the two mirrors corresponds to their respective planes of intersection with the pyramidal optical ray bundle between the lens and the rectangular film exposure area, thereby minimizing the size of the mirrors and their corresponding supporting structures. Because the central optical ray is folded through an angle of 180° between the lens and the film plane, the two mirrors are oriented at an angle of 90° relative to each other. Instead of being at 45° angles relative to the lens axis and the film plane, however, lower mirror 94 is at an angle of 35° relative to the film plane, for a focal length of approximately 135 millimeters. Such an angle permits location of the lens close to the film sheet, to reduce the height of the camera and keep the camera compact in other dimensions. The illustrated angular orientation of the two mirrors thus represents a design that achieves greater overall compactness than if the mirrors were located at 45° relative to the film plane and the lens axis.

It is important to note that the film sheet must not receive light reflected directly by upper mirror 86 alone. To prevent that from occurring, an internal housing wall 104 supporting the upper portion of rib 76 serves as a baffle that limits the most acute angle at which an optical ray can reach the film sheet directly from mirror 86.

Figure 3:
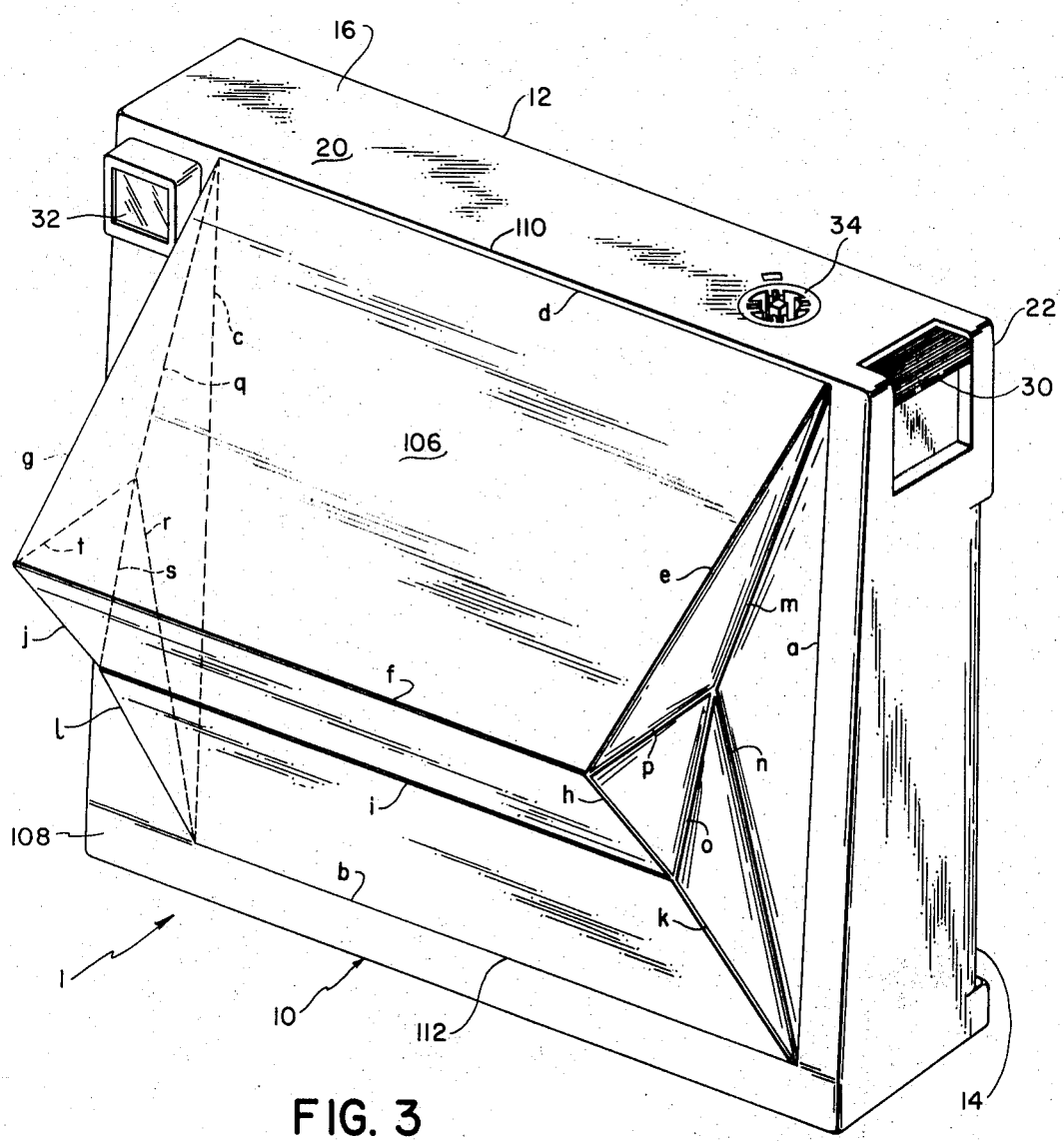
FIG. 3 is a perspective rear view of the camera shown in FIG. 1.

The mirror enclosure 106 comprises a flexible bellows formed of a thin, opaque, elastomeric material, such as rubber, neoprene, silicone rubber, and the like, and is crimped, cemented, or otherwise fixedly secured along the forward edge portions of its rectangular base to the rear wall 108 of the camera housing, as at 110 and 112, to provide a light-tight optical path between the lens, the mirrors, and the film sheet. The endwise profile of the enclosure corresponds generally to the angular shape defined by the location of th mirrors, and the enclosure preferably is spaced slightly from the mirror support structure so that a slight dent or distortion of the enclosure will not detract from the accurate positioning of the mirrors. Although the mirror enclosure is generally rectangular at its base, it may be tapered inwardly as it extends rearwardly for purposes of aesthetics and compactness, and in this regard the size of the illustrated enclosure could 2e further reduced ky making it conform more closely to the pyramidal optical path. Preferably, enclosure 106 is narrower than rear wall 108 of the camera housing and is spaced from the ends of the housing, as shown in FIG. 3, so that the housing can be gripped conveniently by the user. Enclosure 106 is made so that it is readily foldable, along the fold lines $a-t$ indicated in FIG. 3, from its fully extended configuration shown in FIGS. 3 and 5 to its folded configuration shown in FIGS. 6 and 7.

AN ALTERNATIVE EMBODIMENT

Figure 8:
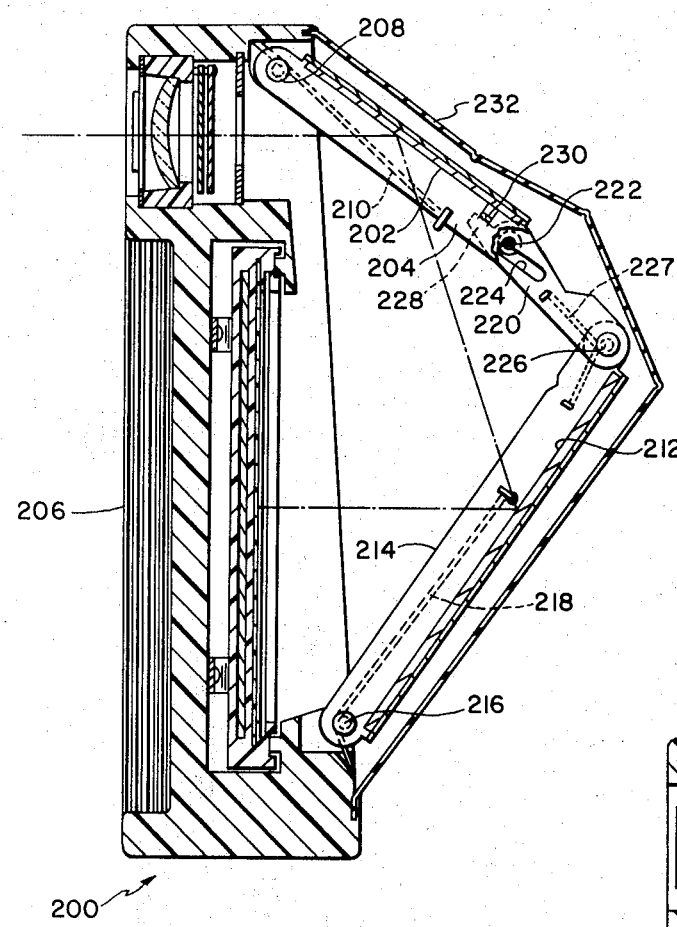
FIG. 8 is a cross-sectioned, end-elevational view similar to FIG. 5 but showing a large-format camera constructed in accordance with an alternative embodiment of the invention in its erect, operative configuration.
Figure 9:
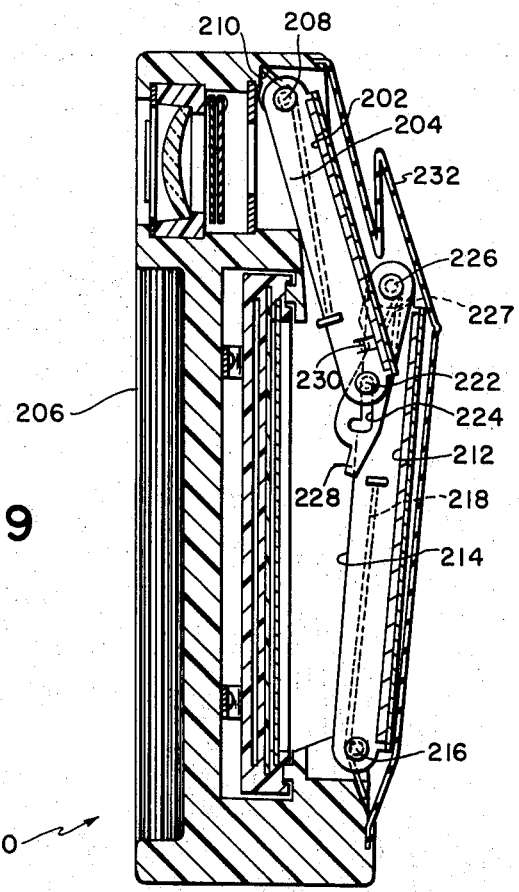
FIG. 9 is a cross-sectioned, end-elevational view similar to FIG. 8 but showing the camera of that figure in its collapsed, inoperative configuration.

A camera 200 constructed in accordance with an alternative embodiment of the present invention is illustrated in FIGS. 8 and 9, which correspond to FIGS. 5 and 7, respectively, referred to above. Camera 200 of this embodiment differs from camera 1 of the preferred embodiment only in the linkage arrangement used for moving the two mirrors between their operative and inoperative positions, in th means employed for releasably retaining the mirrors in those positons, and in the flexible enclusre used for maintaining the lens, mirrors, and film sheet in light-tight relation.

Referring first to FIG. 8, which shows the mirrors in their operative positions, upper mirror 202 is supported by a link 204 that is pivotally coupled at its forwardly extending end portion to the camera housing 206 by a pin 208. Link 204 is biased in a counterclockwise direction away from the housing by a spring 210. Lower mirror 212 is supported by a link 214 that is pivotally coupled at its fowardly extending end portion to the housing by pin 216. Link 214 is biased in a counterclockwise direction toward the housing by a spring 218 which is stronger than spring 210. Pivotally interconnecting links 204 and 214 are a pair of links 220, only one of which is shown, that are disposed at opposite sides of links 204 and 214. Each link 220 is pivotally coupled at its forwardly extending end portion to the rearwardly extending end portion of link 204 by a pin 222 secured to link 204 and received in an L-shaped slot 224 in link 220, and each link 220 is pivotally coupled at its rearwardly extending end portion to the rearwardly extending end portion of link 214 by a pin 226. Links 220 are biased in a counterclockwsie direction by springs 227 which are weaker than spring 210. It will be seen that pin 222 does not lie on the line of centers between pins 208 and 226. This is because links 204 and 220, when in their fully erect positions, are cocked, in toggle fashion, at a slight angle relative to the line of centers as shown. That angle is determined by the engagement of a nose 228 on the forwardly extending end portion of link 220 with a cooperating tab 230 on the rearwardly extending end portion of link 204. When links 204 and 220 are so cocked, pins 222, with the aid of springs 227, are seated at the upper ends of the short legs of the L-shaped slots 224 in links 220 to prevent relative sliding movement of pins 222 along the long legs of slots 224, thereby locking links 204 and 220, and also link 214, in their fully erect positions. Those positions are thus maintained, with the aid of springs 210 and 218, until the user desires to collapse the linkage in order to move the mirrors to their inoperative positions.

To collapse the linkage in camera 200, the user need merely press downwardly and forwardly with his thumbs against those portions of the flexible enclosure 232 that lie directly behind pins 222, thereby urging those pins out of their seated positions in the short legs of L-shaped slots 224 toward the forward ends of the long legs of those slots. At the same time, link 204 is caused to pivot clockwise about pin 208 toward the camera housing, links 220 are causes to pivot counterclockwise about pins 222 and 226, and link 214 is caused to pivot counterclockwise about pin 216 toward the housing. As link 204 approaches its forwardmost position, the relatively strong spring 218, aided by the relatively weak springs 227 and the lost motion allowed by the long legs of slots 224, causes links 214, 220, and 204 to complete their collapsing movements and assume their collapsed positions shown in FIG. 9. Those positions are then maintained by spring 218 until the user again wishes to return the links to their erect positions. To do that, he need merely squeeze the flexible enclosure 232 laterally inwardly against the ends of pins 226 and pull rearwardly, thereby causing motions of the various links in directions opposite to those described above, until the linkage again becomes releasably retained in its erect condition shown in FIG. 8.

The flexible enclosure 232 of this embodiment comprises a bellows similar to that described above in reference to the preferred embodiment, the principal differences being the different way in which it is folded over the linkage and the different profiles it assumes in its erect and collapsed conditions.

Although the cameras of both embodiments illustrated herein employ two sustantially flat, reflective surfaces and a lens, it should be noted that the lens theoretically could be elminated entirely by employing one or more spherical or parabolic mirrors to focus the photographic image onto the film sheet.

The invention has been described in detail with particular reference to the illustrated preferred and alternative embodiments thereof, but it will be understood that variations and modifications can be effected within the spirit and scope of the invention.

What is claimed is:

1. A photographic camera comprising:
    a generally rectangular housing including means for supporting a sheet of photographic film in an exposure plane;
    a lens for establishing a focused image of a subject to be photographed;
    a pair of reflecting surfaces pivotally supported by said housing and pivotally coupled to each other for pivotal movement from respective operative positions wherein said surfaces and said housing are disposed in substantially triangular relation to one another and wherein said surfaces extend substantially beyond said housing to define a folded optical path between said lens and the film, for locating the focused image in coincidence with said plane, to respective inoperative positions wherein said surfaces are retracted toward and lie substantially flat against said housing; and means enclosing said reflecting surfaces in light-tight relation to said housing and movable in cooperation with said surfaces from an erect position wherein said surfaces are in said operative positions to a collapsed position wherein said surfaces are in said inoperative positions.

2. A photographic camera comprising:

a relatively thin, box-like housing including means for supporting a sheet of photographic film in a plane generally parallel with said housing, said plane being substantially vertical when said camera is oriented to photograph a subject disposed forwardly thereof and aligned horizontally therewith;

a lens supported by said housing and defining an optical axis that extends through said plane and to one side of said supporting means;

a pair of generally planar mirrors pivotally coupled to each other and pivotally supported by said housing near said lens and said supporting means, respectively, for pivotal movement from respective operative positions, wherein said mirrors are disposed angularly relative to each other and project angularly from said housing to provide a folded optical path between said lens and the film, to respective inoperative positions wherein said mirrors are retracted toward and disposed substantially parallel with said plane; and means enclosing said mirrors in light-light relation to said housing and adjustable, in conjunction with said movement of said morrors, from an erect condition wherein said mirrors are in said operative positions to a collapsed condition wherein said mirros are in said inoperative positions.

3. A photographic camera comprising:

a housing having spaced front and back portions defining an overall thickness of said housing substantially less than its overall length and width, said housing including means for supporting a photosensitive film sheet in a generally vertical, rearward-facing exposure plane when said camera is oriented to photograph a subject forward thereof and horizontally aligned therewith;

a forward-facing objective lens supported by said housing and defining an optical axis that extends through said plane adjacent to said supporting means for focusing an image of the subject on the photosenstive film sheet;

fist and second substantially flat reflective surfaces pivotally coupled to each other and to said housing behind said plane for pivotal movement from respective operative positions, wherein said surfaces protrude rearwardly from said housing and are displaced from each other by an angle of approximately 90° to deflect an optical ray passing rearwardly from said lens along said axis through an angle of approximately 180° to locate the image of the subject on the photosensitive film sheet, to respective inoperative positions wherein said surfaces are retracted toward said plane in generally parallel relation to render said camera more compact; and means enclosing said reflective surfaces in light-tight relation to said housing and convertible, in coaction with said movement of said surfaces, from an extended condition wherein said surfaces are in said operative positions to a retracted condition wherein said surfaces are in said inoperative positions.

4. A photographic camera as claimed in claim 3 further comprising means for releasably securing said reflective surfaces in said operative positions.

5. A photographic camera as claimed in claim 3 further comprising means for releasably securing said enclosing means in said retracted condition.

6. A photographic camera as claimed in claim 3 wherein at least one of said reflective surfaces is of trapezoidal shape corresponding generally to its plane of intersection with the pyramidal optical path between said lens and a generally rectangular area of said exposure plane.

7. A photographic camera as claimed in claim 3 wherein said enclosing means when in said extended conditon is of substantially the same profile as the corresponding portion of the optical path as folded by said reflective surfaces.

8. A photographic camera as claimed in claim 3 wherein said enclosing means includes a foldable bellows.

9. A photographic camera comprising:

a housing having spaced front and back portions defining an overall thickness of said housing substantially less than its overall length and width, said housing including means for supporting a photosensitve film sheet in a generally vertical, rearward-facing exposure plane when said camera is oriented to photograph a subject forward thereof and horizontally aligned therewith;

a forward-facing objective lens supported by said housing and defining a optical axis that extends through said plane adjacent to said supporting means for focusing an image of the subject on the photosensitive film sheet;

first and second substantially flat reflective surfaces supported by linkage means pivotally coupled to said housing behind said plane for movement from an erect condition wherein said surfaces are in respective operative positions, in which said surfaces protrude rearwardly from said housing and are displaced from each other by an angle of approximately 90° to deflect an optical ray passing rearwardly from said lens along said axis through an angle of approximately 180° to locate the image of the subject on the photosenstive film sheet, to a collapsed condition wherein said surfaces are in respective inoperative positions, in which said surfaces are retracted toward said plane to render said camera more compact; and means enclosing said reflective surfaces in light-tight relation to said housing and convertible, in coaction with said movement of said linkage means, from an extended condition wherein said surfaces are in said operative positions to a retracted condition wherein said surfaces are in said inoperative positions.

10. A photographic camera as claimed in claim 9 wherein said linkage means includes a first link pivotally coupled at one end portion thereof to said housing and supporting said first reflective surface, a second link pivotally coupled at one end portion thereof to said housing and supporting said second reflective surface, and a third link pivotally coupled at one end portion thereof to the other end portion of said first link and pivotally coupled at its other end portion to said second link at a point thereon intermediate the end portions thereof.

11. A photographic camera as claimed in claim 10 further comprising means for releasably maintaining said linkage means in said erect condition.

12. A photographic camera as claimed in claim 11 wherein said maintaining means includes spring means biasing said second link for pivotal movement away from said housing and means at the other end portion of said second link engageable with cooperating means at said one end portion of said third link for stopping said pivotal movement when said linkage means has reached said erect condition.

13. A photographic camera as claimed in claim 12 wherein said maintaining means further includes spring means biasing said first link for pivotal movement toward said housing.

14. A photographic camera as claimed in claim 9 wherein said linkage means includes a first link pivotally coupled at one end portion thereof to said housing and supporting said first reflective surface, a second link pivotally coupled at one end portion thereof to said housing and supporting said second reflective surface, and a third link pivotally coupled at one end portion thereof to the other end portion of said first link and pivotally coupled at its other end portion to the other end portion of said second link.

15. A photographic camera as claimed in claim 14 further comprising means for releasably maintaining said linkage means in said erect condition.

16. A photographic camera as claimed in claim 15 wherein said maintaining means includes spring means biasing said first link for pivotal movement away from said housing and means on one of said first and third links engageable with cooperating means on the other of said first and third links for stopping said pivotal movement when said linkage means has reached said erect condition.

17. A photographic camera as claimed in claim 16 wherein said maintaining means furher includes spring means biasing said second link for pivotal movement toward said housing.

18. In a photographic camera having first, second, and third members disposed in triangular relationship, said first member including means for locating photosensitive material at an exposure position in a predetermined plane an an objective lens having an optical axis offset from said exposure position and substantially normal to said plane; said second and third members occupying predetermined angular positions relative to said first member and supporting a pair of reflective surfaces in planes substantially normal to each other and in light-reflecting alignment with said lens and said exposure position, respectively, for deflecting light from said lens through substantially 180° to the photosensitive material in said exposure position, an improvement rendering said camera more compact, said improvement comprising:

means mounting said second and third members on said first member for movement from said predetermined angular positions to respective folded positions wherein said second and third members lie close to said first member, said mounting means including means pivotally coupling one end portion of said second member to said first member at a first location thereon, means pivotally coupling one end portion of said third member to said first member at a second location thereon spaced from said first location, and a fourth member pivotally coupled at one end portion thereof to the other end portion of said second member and pivotally coupled at its other end portion to said third member; and means for releasably retaining said second and third members in said predetermined angular positions.

19. The camera improvement claimed in claim 18 further comprising means for releasably holding said second and third members in said respective folded positions.

20. The camera improvement claimed in claim 18 further comprising means for maintaining said reflective surfaces in light-tight relation to said lens and said exposure position.

21. The camera improvement claimed in claim 20 wherein said maintaining means includes a foldable bellows.

22. The camera improvement claimed in claim 18 wherein said fourth member is pivotally coupled at its other end portion to said third member at a location thereon intermediate the end portions thereof.

23. The camera improvement claimed in claim 22 wherein said retaining means includes means biasing said third member for pivotal movement in a direction toward its predetermined angular position, means on one of said third and fourth members engageable with cooperating means on the other of said third and fourth members for stopping said pivotal movement when said third member has reached its predetermined angular position, and means biasing said second member for pivotal movement in a direction toward its respective folded position.

24. The camera improvement claimed in claim 18 wherein said fourth member is pivotally coupled at its other end portion to said third member at the other end portion thereof.

25. The camera improvement claimed in claim 24 wherein said retaining means includes means biasing said second member for pivotal movement in a direction toward its predetermined angular position, means on one of said second and fourth members engageable with cooperating means on the other of said second and fourth members for stopping said pivotal movement when said second member has reached its predetermined angular position, and means biasing said third member for pivotal movement in a direction toward its respective folded position.

* * * * *